(12) United States Patent
Boemler (10) Patent No.: US 9,762,824 B2
(45) Date of Patent: Sep. 12, 2017

(54) GAIN ADAPTABLE UNIT CELL

(71) Applicant: RAYTHEON COMPANY, Waltham, MA (US)

(72) Inventor: Christian M. Boemler, Lompoc, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/984,571

(22) Filed: Dec. 30, 2015

(65) Prior Publication Data

US 2017/0195595 A1    Jul. 6, 2017

(51) Int. Cl.
*H04N 5/357* (2011.01)
*H04N 5/372* (2011.01)

(52) U.S. Cl.
CPC ....... *H04N 5/3575* (2013.01); *H04N 5/37206* (2013.01)

(58) Field of Classification Search
CPC . H04N 5/3559; H04N 5/3575; H04N 5/37206
See application file for complete search history.

(56) References Cited

U.S. PATENT DOCUMENTS

| 2004/0079977 | A1* | 4/2004 | Ying | H04N 5/3559 257/292 |
| 2007/0007434 | A1* | 1/2007 | Pain | H01L 27/14609 250/208.1 |
| 2008/0105909 | A1* | 5/2008 | Ham | H01L 27/14609 257/292 |
| 2008/0164403 | A1 | 7/2008 | Hall et al. | |
| 2008/0164404 | A1* | 7/2008 | Mansoorian | H04N 5/3559 250/208.1 |
| 2009/0256940 | A1* | 10/2009 | Pahr | H04N 5/3698 348/308 |
| 2009/0261235 | A1* | 10/2009 | Lahav | H04N 5/35572 250/208.1 |
| 2010/0271517 | A1* | 10/2010 | De Wit | H04N 5/378 348/294 |
| 2010/0302407 | A1* | 12/2010 | Ayers | H04N 5/347 348/230.1 |

(Continued)

FOREIGN PATENT DOCUMENTS

| JP | 2001141562 A | 5/2001 |
| WO | 2005122551 A1 | 12/2005 |

OTHER PUBLICATIONS

International Search Report and Written Opinion for Application PCT/US2016/038496 mailed Sep. 1, 2016.

*Primary Examiner* — Timothy J Henn
(74) *Attorney, Agent, or Firm* — Lando & Anastasi, LLP (57) ABSTRACT

An imaging system unit cell and method of detecting an image. One example of an imaging system unit cell includes a photodetector configured to generate a photo-current in response to receiving optical radiation, a variable capacitance charge storing circuit in electrical communication with the photodetector and configured to integrate an electrical charge accumulated from the photo-current, a control circuit configured to monitor an integration voltage across the variable capacitance charge storing circuit and adjust a capacitance of the variable capacitance charge storing circuit based on the integration voltage, and an output configured to provide an output voltage based at least in part on the integrated voltage.

17 Claims, 3 Drawing Sheets

(56) References Cited

U.S. PATENT DOCUMENTS

| | | | |
|---|---|---|---|
| 2012/0091323 A1 | 4/2012 | Kawahito | |
| 2012/0188427 A1* | 7/2012 | Solhusvik | H04N 5/3559 348/300 |
| 2012/0256077 A1* | 10/2012 | Yen | H01L 27/14609 250/208.1 |
| 2014/0103189 A1* | 4/2014 | Chen | H04N 5/3559 250/208.1 |
| 2016/0212362 A1* | 7/2016 | Pang | H04N 5/3559 |

* cited by examiner

GAIN ADAPTABLE UNIT CELL

BACKGROUND

Focal Plane Arrays (FPAs) generally include a two-dimensional array of detector elements, or unit cells (i.e., pixels), organized in rows and columns. A circuit within each unit cell of the FPA accumulates charge corresponding to the flux of incident optical radiation at a detector within the unit cell to generate an image of a scene or object within a field of view (FOV) of the FPA. For instance, most unit cell circuits detect optical radiation at a photo-diode. The charge is accumulated at a single capacitive element, which integrates the charge, and produces an integration voltage. The produced integration voltage corresponds to the intensity of the flux over a given time period referred to as the integration period (or integration interval). The resulting voltage is conveyed by additional circuitry to an output of the array, which then may be used to construct the image of the scene that emitted the optical radiation. In some instances, such a voltage or charge can be digitized by circuitry of the FPA resulting in an array of binary values, at least one value for each unit cell of the FPA. Accordingly, in some instances FPAs may be used to convert a two-dimensional pattern of flux into a two-dimensional array of binary values, resulting in a digital image.

SUMMARY OF THE INVENTION

Aspects and embodiments are generally directed to imaging systems, FPA unit cells, and unit cell circuits with a high dynamic range (i.e., a low noise floor and a high well capacity). Various aspects and embodiments include a unit cell circuit including a variable capacitance charge storing circuit configured to dynamically accommodate low flux levels and high flux levels, as well as changes in flux level during an integration period. Accordingly, technical advantages provided by aspects and embodiments may include improved feasibility and performance, among various other advantages discussed below, relative to conventional imaging architectures.

According to an aspect, provided is an imaging system unit cell. In one example, the imaging system unit cell includes a photodetector configured to generate a photo-current in response to receiving optical radiation, a variable capacitance charge storing circuit in electrical communication with the photodetector and configured to integrate an electrical charge accumulated from the photo-current, a control circuit configured to monitor an integration voltage across the variable capacitance charge storing circuit and adjust a capacitance of the variable capacitance charge storing circuit based on the integration voltage, and an output configured to provide an output voltage based at least in part on the integrated voltage.

In an embodiment, the variable capacitance charge storing circuit includes a first charge storing device and a second charge storing device. According to one embodiment, the variable capacitance charge storing circuit includes a first switch positioned to selectively couple the second charge storing device and the first charge storing device together in parallel. In one embodiment, the control circuit includes a comparator configured to compare the integration voltage and a first saturation threshold and generate a first comparator signal responsive to determining the integration voltage exceeds the first saturation threshold, and a dynamic shift register configured to receive the first comparator signal and responsively generate a first switching signal to activate the first switch.

According to an embodiment, the variable capacitance charge storing circuit includes a third charge storing device and a second switch, and the control circuit is configured to adjust the capacitance of the variable capacitance charge storing circuit by selectively coupling the third charge storing device together in parallel with the second charge storing device and the first charge storing device via the second switch. In an embodiment, the comparator is configured to compare the integration voltage and a second saturation threshold and generate a second comparator signal responsive to determining the integration voltage exceeds the second saturation threshold, and the dynamic shift register is configured to receive the second comparator signal and generate a second switching signal to activate the second switch.

In one embodiment, the first saturation threshold is substantially equal to the second saturation threshold. According to an embodiment, the control circuit is configured to provide a state signal including enable settings of the variable capacitance charge storing circuit.

According to one embodiment, the imaging system unit cell further includes a Correlated Double Sampling (CDS) charge storing device selectively coupled via a CDS switch with the variable capacitance charge storing circuit. In an embodiment, the CDS charge storing device is configured to integrate the electrical charge accumulated from the photo-current responsive to activation of the CDS switch. According to one embodiment, the imaging system unit cell further includes a sample-hold charge storing device coupled to the CDS charge storing device via a sample-hold switch, the sample-hold charge storing device configured to sample and hold the integration voltage.

According to an aspect, provided is a method of detecting an image. In an example, the method includes generating a photo-current in response to receiving optical radiation at a photodetector, integrating an electrical charge accumulated from the photo-current at a variable capacitance charge storing circuit in electrical communication with the photodetector, monitoring an integration voltage across the variable capacitance charge storing circuit, adjusting a capacitance of the variable capacitance charge storing circuit based on the integration voltage, and providing an output voltage based at least in part on the integrated voltage.

In an embodiment, the variable capacitance charge storing circuit includes a first charge storing device and a second charge storing device, and adjusting the capacitance of the variable capacitance charge storing circuit includes selectively coupling the second charge storing device and the first charge storing device together in parallel. According to one embodiment, monitoring the integration voltage across the variable capacitance charge storing circuit includes comparing the integration voltage and a first saturation threshold determining whether the integration voltage exceeds the first saturation threshold, and responsive to a determination that the integration voltage exceeds the first saturation threshold, generating a first comparator signal.

According to an embodiment, the variable capacitance charge storing circuit includes a first switch, and selectively coupling the second charge storing device and the first charge storing device includes generating a first switching signal to activate the first switch responsive to receiving the first comparator signal. In one embodiment, the variable capacitance charge storing circuit includes a third charge storing device and a second switch, and adjusting the capacitance of the variable capacitance charge storing circuit includes selectively coupling the third charge storing device together in parallel with the second charge storing device and the first charge storing device via the second switch.

In one embodiment, monitoring the integration voltage across the variable capacitance charge storing circuit includes comparing the integration voltage and a second saturation threshold, determining whether the integration voltage exceeds the second saturation threshold, and responsive to a determination that the integration voltage exceeds the second saturation threshold, generating a second comparator signal. According to an embodiment, selectively coupling the third charge storing device together in parallel with the second charge storing device and the first charge storing device via the second switch includes generating a second switching signal to activate the second switch responsive to receiving the second comparator signal. In an embodiment, the first saturation threshold is substantially equal to the second saturation threshold. According to an embodiment, the method further includes selectively coupling a Correlated Double Sampling (CDS) charge storing device with the variable capacitance charge storing circuit, and integrating the electrical charge accumulated from the photo-current at the CDS charge storing device.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments relate to unit cells for Focal Plane Arrays (FPAs). Various aspects and embodiments are directed to FPA unit cell circuits and methods of imaging using the same, and in particular, to unit cell circuits with a high dynamic range (i.e., a low noise floor and a high well capacity). Various aspects and embodiments include a variable capacitance charge storing circuit configured to dynamically adapt a gain of the unit cell relative to a flux level of incident electromagnetic radiation. Such aspects and embodiments provide a low noise floor for low flux unit cell conditions, and a large well capacity for high flux unit cell conditions. As further discussed herein, various aspects and embodiments also provide a unit cell capable of accommodating variations in flux level during an integration period of the unit cell.

Typical unit cell circuits accumulate charge corresponding to the flux of impinging optical radiation of a given wavelength. Typically, the charge is accumulated at a single capacitive element, which integrates the charge, and produces an integration voltage. Previous attempts at providing a high dynamic range unit cell have suggested modifying the integration period of the unit cell such that the integration period for low flux levels is longer than that for high flux levels. However, such an approach fails to accommodate variations in flux level during the integration period. For instance, variations in flux level as a result of a changing scene can drastically change the integration period required by such an approach. Accordingly, in addition to making management and control of unit cells within an FPA inefficient and cumbersome, known schemes for a high dynamic range unit cells suffer undesirable effects of unpredictable capacitive charge-sharing accuracy that may naturally result from modifying the integration period.

Accordingly, various aspects and embodiments of the improved unit cell discussed herein include a variable capacitance charge storing circuit in electrical communication with a photodetector and configured to accommodate large flux levels and low flux levels, as well as accommodate for variations in the flux level during an integration period. In particular, the variable capacitance charge storing circuit cycles through a sequence of operation phases, each of which sequentially increase the well capacity of the variable capacitance charge storing circuit. For example, the variable capacitance charge storing circuit may cycle from a low well capacity and low noise phase of operation to accommodate low flux level signals, to a high well capacity and high noise phase of operation to accommodate for high flux level signals. Accordingly, technical advantages provided by aspects and embodiments may include improved feasibility, efficiency, and performance, among various other advantages discussed below, relative to conventional imaging architectures.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
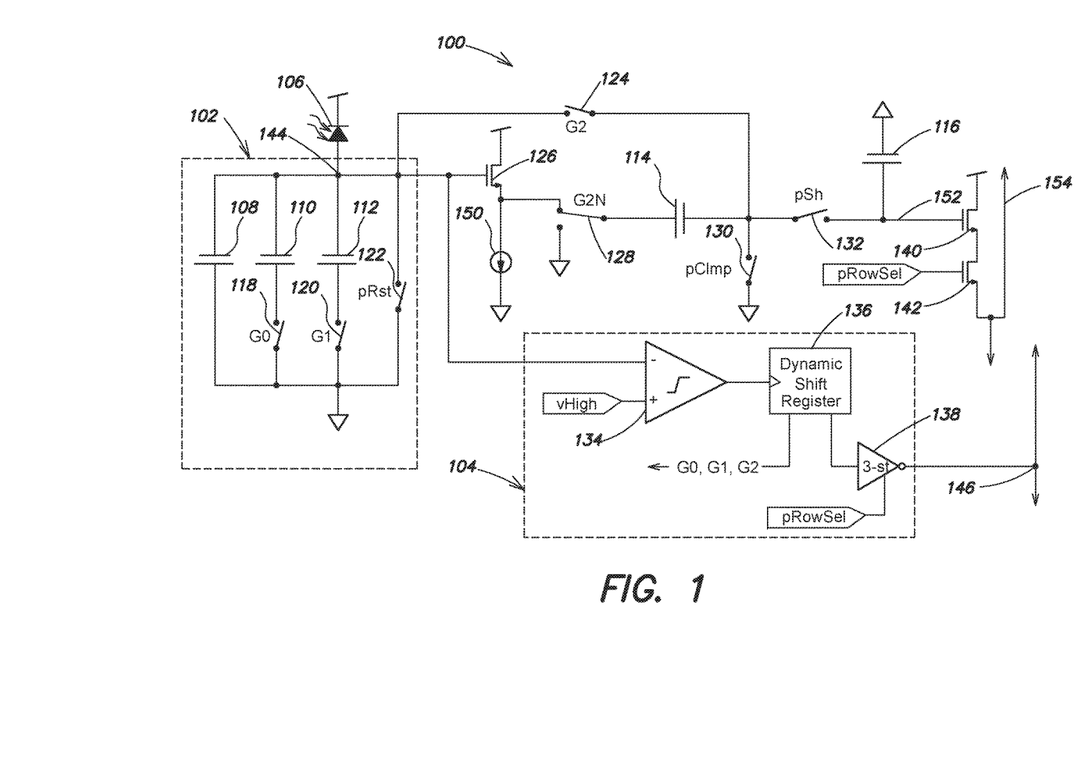
FIG. 1 is a schematic illustration of one example of an imaging system unit cell circuit according to aspects of the invention.

FIG. 1 shows a schematic illustration of one example of an imaging system unit cell circuit 100 according to various aspects and embodiments. In various embodiments, the unit cell circuit 100 may include a detector (e.g., photodetector 106), a variable capacitance charge storing circuit 102, a control circuit 104, and an output 152. As shown, in further embodiments the circuit 100 may also include one or more Metal-Oxide-Semiconductor (MOS) transistors (e.g., first transistor 126, second transistor 140, and third transistor 142), a Correlated Double Sampling (CDS) charge storing device 114, a sample-hold charge storing device 116, and one or more switching devices, such as a first switch 118 ("G0"), a second switch 120 ("G1"), a reset switch 122 ("pRst"), a CDS switch 124 ("G2"), a sample-hold switch 132 ("pSh"), a clamp switch 130 ("pClmp"), and one or more other switches.

As shown in FIG. 1, in various embodiments the circuit 100 accumulates an electrical charge from the photodetector 106 responsive to the photodetector 106 receiving optical radiation of a given wavelength. The photodetector 106 is coupled to an input node 144 of the unit cell circuit 100 and in electrical communication with at least the variable capacitance charge storing circuit 102. As FIG. 1 shows, the input node 144 may also be coupled to the control circuit 104, a gate of the first transistor 126, and the CDS charge storing device 114. In particular, FIG. 1 shows a first terminal of the CDS charge storing device 114 coupled to the input node 144 via the CDS switch 124 and a second terminal of the CDS charge storing device 114 coupled to the source of the first transistor 126 via an additional switch 128 ("G2N"). The electrical charge accumulated by the circuit 100 corresponds to the flux level of the optical radiation received at the photodetector 106. The particular photodetector 106 of various embodiments may include any detector selected to be sensitive to optical radiation of a desired wavelength. In at least one example, optical radiation may include visible light, infrared radiation, and ultraviolet radiation. For instance, the photodetector 106 may include a photo-diode configured to generate a photo-current responsive to receiving wavelengths of light ranging from as small as 0.3 microns up to 2.5 microns and greater. For example, optical radiation of a desired wavelength may be generated by one or more illuminator of an imaging system and configured to illuminate a scene to be imaged.

In various embodiments, the variable capacitance charge storing circuit 102 is coupled and in electrical communication with the photodetector 106. In particular, one or more charge storing devices of the variable capacitance charge storing circuit 102 are configured to receive the photo-current generated by the photodetector 106 and integrate the accumulated electrical charge. As shown in FIG. 1, the one or more charge storing devices of the variable capacitance charge storing circuit 102 may include a capacitor, for example. In one embodiment, the one or more charge storing devices are arranged in a sequential order. That is, in one embodiment, the one or more charge storing devices are coupled and arranged in a predetermined order such that the sequential coupling of an additional charge storing device incrementally increases collective capacitance value (i.e., the well capacitance) of the variable capacitance charge storing circuit 102.

For instance, FIG. 1 shows the variable capacitance charge storing circuit 102 including a first charge storing device 108, a second charge storing device 110, and a third charge storing device 112. In other embodiments, the variable capacitance charge storing circuit 102 may include any number of charge storing devices. In the shown embodiment, the first charge storing device 108 includes a parasitic capacitor. In such an embodiment, the first charge storing device 108 may have a capacitance value of 17 femto-farads, the second charge storing device 110 may have a capacitance value of 60 femto-farads, and the third charge storing device 112 may have a capacitance value of 250 femto-farads. However, in various additional embodiments the one or more charge storing elements of the variable capacitance charge storing circuit 102 may have various other values.

Individual charge storing devices of the variable capacitance charge storing circuit 102 may be selectively coupled via the one or more switching devices. As FIG. 1 shows, the one or more switching devices may include the first switch 118 positioned to couple the second charge storing device 110 in parallel with the first charge storing device 108, and the second switch 120 positioned to couple the third charge storing device 112 in parallel with the first and second charge storing devices 108, 110. Control of the one or more switching devices of various embodiments may be managed by the control circuit 104, as further discussed below. In particular, switching devices of various embodiments may include any suitable switch configured to be activated and deactivated (i.e., open and closed), and may be driven by one or more switching signals from the control circuit 104. As FIG. 1 further shows, the variable capacitance charge storing circuit 102 may include a reset switch 122 coupled to circuitry capable of resetting the charge storing circuit 102 back to an initial condition. In one example, the integration period of the unit cell circuit 100 begins with the deactivation (i.e., opening) of the reset switch 122. While the reset switch 122 is activated, the charge storing devices of the variable capacitance charge storing circuit 102 are reset to a predetermined level for subsequent integration of the accumulated charge.

In various embodiments the unit cell circuit 100 is configured to dynamically adapt to accommodate low flux levels, high flux levels, and varying flux levels. In particular, the control circuit 104 may include one or more components configured to monitor the integration voltage across the variable capacitance charge storing circuit 102 and adjust the capacitance of the variable capacitance charge storing circuit 102 accordingly. As shown, the control circuit 104 may include a comparator 134 and a dynamic shift register 136, among other components. The comparator 134 includes a first input terminal (shown as an inverting input) coupled to the input node 144 of the unit cell circuit 100 and an output node coupled to the dynamic shift register 136. The comparator 134 receives a saturation threshold (e.g., voltage saturation threshold shown as "vHigh") at a second input terminal (shown as a non-inverting input), and compares the integration voltage across the variable capacitance charge storing circuit 102 to the saturation threshold. In various embodiments, the saturation threshold may be pre-defined, or automatically generated by the control circuit 104.

The comparator 134 compares the saturation threshold and the integration voltage and provides a comparator signal indicating which of the compared values is larger. That is, in various embodiments the comparator 134 determines whether the integration voltage meets or exceeds the saturation voltage, and provides a comparator signal when the integration voltage meets or exceeds the saturation threshold. For example, the comparator signal may include a digital signal to be received by the dynamic shift register 136.

The dynamic shift register 136 receives the comparator signal from the comparator 134, and responsively generates one or more switching signals to activate the one or more switching devices, such as the first switch 118, the second switch 120, and/or CDS switch 124. In particular, the dynamic shift register 136 is configured to generate one or more switching signals to activate the first switch 118, the second switch 120, or the CDS switch 124 when the saturation threshold has been exceeded. For example, the dynamic shift register 136 may include a cascade of flip-flops, the output of each flip-flop being connected to an input of the next succeeding flip-flop. In such an embodiment, the dynamic shift register 136 is configured to shift by one bit each time the saturation threshold is exceeded, and sequentially activate an additional charge storing device of the variable capacitance charge storing circuit 102.

In various embodiments, responsive to deactivation (i.e., opening) of the reset switch 122, the circuit 100 begins a first phase of operation during which the variable capacitance charge storing circuit 102 begins integrating charge at the first charge storing device 108. FIG. 1 shows the circuit 100 in an example first phase of operation. During the first phase, the first switch 118 is maintained in a deactivated position (i.e., open position), the second switch 120 is maintained in a deactivated position, and the CDS switch 124 is maintained in a deactivated position. Responsive to determining that the integration voltage meets or exceeds a first saturation threshold, the comparator 134 generates a first comparator signal which instructs the dynamic shift register 136 to generate a first switching signal configured to activate the first switch 118 and couple the second charge storing device 110 with the first charge storing device 108. Activation of the first switch 118 couples the second charge storing device 110 in parallel with the first charge storing device 108 and effectively increases the well capacity of the circuit 100. In particular, responsive to activation of the first switch 118, the first charge storing device 108 will charge-share with the second charge storing device 110, increasing the well capacity of the circuit 100.

Responsive to activation of the first switch 118, the circuit 100 begins a second phase of operation. During the second phase of operation, the first switch 118 is maintained in an activated position (i.e., closed position), the second switch 120 is maintained in a deactivated position, and the CDS switch 124 is maintained in a deactivated position. Responsive to determining that the integration voltage exceeds a second saturation threshold, the comparator 134 generates a second comparator signal which instructs the dynamic shift register 136 to generate a second switching signal configured to activate the second switch 120 and couple the third charge storing device 112 with the second charge storing device 110 and the first charge storing device 108. Activation of the second switch 120 couples the third charge storing device 112 in parallel with the second charge storing device 110 and the first charge storing device 108, and further increases the well capacity of the circuit 100. Specifically, responsive to activation of the second switch 120, the third charge storing device 112 will charge-share with the first charge storing device 108 and the second charge storing device 110.

While discussed herein as a first saturation threshold and a second saturation threshold, in certain embodiments, the second saturation threshold is set to the same value as the first saturation threshold. That is, the comparator 134 may receive a single saturation threshold to which the integration voltage is compared. Accordingly, in certain examples, the first charge storing device 108 and the second charge storing device 110 will reach saturation at the same time, when the voltage on both charge storing devices 108, 110 meets or exceeds the same saturation threshold.

When the second saturation threshold is exceeded (e.g., the integration voltage meets or exceeds the same saturation threshold as the first saturation threshold for a second time), the second switch 120 is activated and the circuit 100 begins a third phase of operation. During the third phase of operation, the first switch 118 is maintained in an activated position (i.e., closed position) and the second switch 120 is maintained in an activated position. Responsive to determining that the integration voltage meets or exceeds a third saturation threshold (e.g., the integration voltage meets or exceeds the same saturation threshold as the first saturation threshold and the second saturation threshold for a the third time), the comparator 134 generates a third comparator signal which instructs the dynamic shift register 136 to generate a CDS switching signal to activate the CDS switch 124 and couple the CDS charge storing device 114 with the variable capacitance charge storing circuit 102. In particular, activation of the CDS switch 124 couples the CDS charge storing device 114 in parallel with the one or more charge storing devices of the variable capacitance charge storing circuit 102 (e.g., the first charge storing device 108, the second charge storing device 110, and the third charge storing device 112), and further increases the well capacity of the circuit 100. As discussed with reference to the first, second, and third charge storing devices 108, 110, 112, responsive to activation of the CDS switch 124, the CDS charge storing device 114 will charge-share with the charge storing devices of the variable capacitance charge storing circuit 102.

In various embodiments, prior to activation of the CDS switch 124, the control circuit 104 is configured to bleed any charge stored at the CDS charge storing device 114. In particular, the CDS charge storing device 114 of various embodiments may be clamped at a pre-determined voltage by a voltage clamp, and configured to remove noise from the integration voltage based on any suitable correlated double sampling technique. For instance, the voltage clamp may be coupled with the first terminal of the CDS charge storing device 114 via the clamp switch 130. In one embodiment, the control circuit 104 activates and deactivates the clamp switch 130 substantially simultaneously with the reset switch 122. Accordingly, in various embodiments responsive to activation of the first switch 118, the control circuit 104 is configured to bleed any charge stored at the CDS charge storing device 114. In various embodiments, the third saturation threshold is set to the same value as the first saturation threshold and the second saturation threshold. That is, exceeding the third saturation threshold may include exceeding a single saturation threshold (utilized as the first saturation threshold and the second saturation threshold) for a third time.

As also shown in FIG. 1, in various embodiments the circuit 100 may include a source follower including the first transistor 126 coupled to a current source 150. In certain embodiments, the source follower has nearly unity gain buffering of the voltage between the input node 144 and the CDS charge storing device 114 during a reset sampling period of the CDS charge storing device 114. In various embodiments, the CDS switch 124 is controlled to be in an opposite state of a negative polarity CDS switch (i.e., the additional switch 128) interposed between the source follower and the CDS charge storing device 114. That is, in certain embodiments the additional switch 128 is activated when the CDS switch 124 is deactivated, and the additional switch 128 is deactivated when the CDS switch 124 is activated. Accordingly, responsive to determining that the integration voltage meets or exceeds the third saturation threshold (e.g., the integration voltage meets or exceeds a single saturation threshold a third time), the additional switch 128 may be deactivated as the CDS switch 124 is activated.

Figure 2:
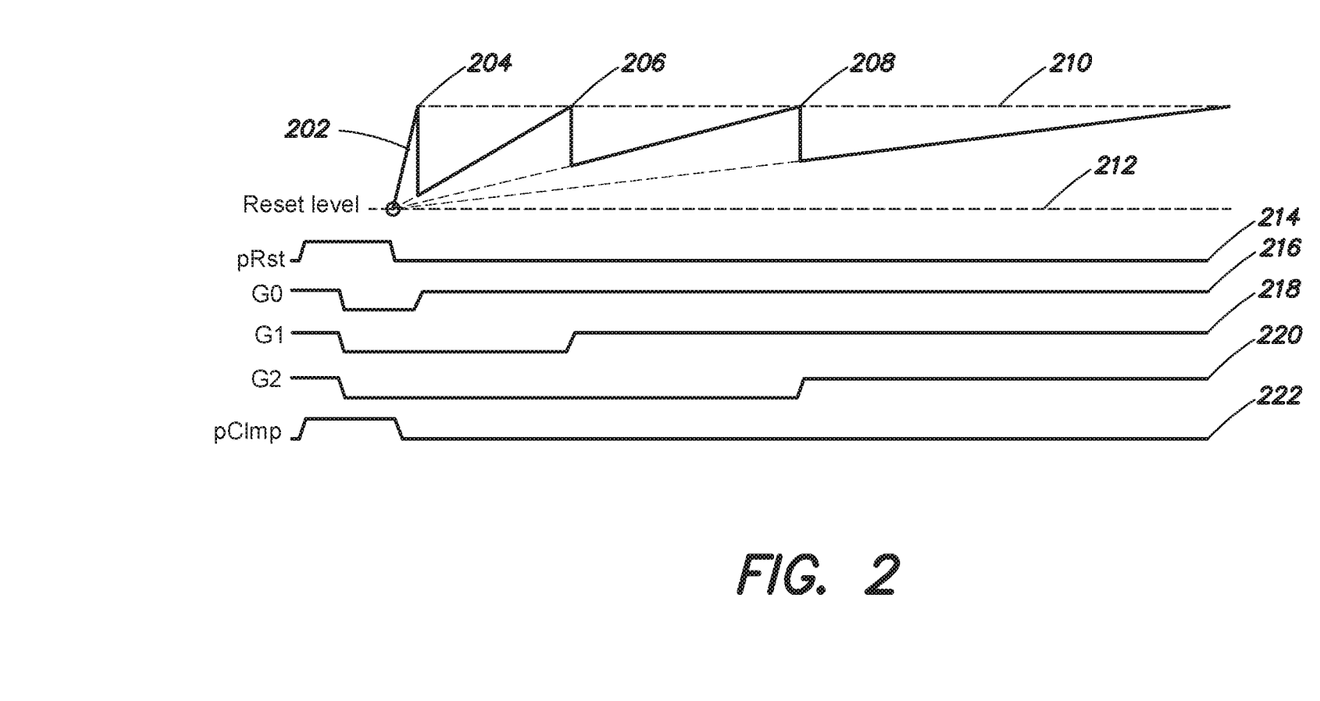
FIG. 2 is an illustration of one example of a switching diagram of the imaging system unit cell shown in FIG. 1, according to aspects of the invention.

Turning briefly to FIG. 2, provided is an illustration of one example of a switching diagram of the imaging system unit cell circuit 100 shown in FIG. 1. FIG. 2 is described with continuing reference to the unit cell circuit 100 shown in FIG. 1. A first trace 202 shows an example plot of an integration voltage of the circuit over an illustrative period of time, a second trace 214 shows an example visualization of an activation state of the reset switch ("pRst") according to a switching signal from the control circuit, a third trace 216 shows an example visualization of an activation state of the first switch ("G0") according to a switching signal from the control circuit, a fourth trace 218 shows an example visualization of an activation state of the second switch ("G1") according to a switching signal from the control circuit, a fifth trace 220 shows an example visualization of an activation state of the CDS switch ("G2") according to a switching signal from the control circuit, and a sixth trace 222 shows an example visualization of an activation state of the clamp switch ("pClmp") according to a switching signal from the control circuit.

As FIG. 2 shows, the integration voltage starts at an initial value approximately equal to the reset voltage (indicated as ghost line 212). For purposes of explanation, the first saturation threshold, second saturation threshold, and third saturation threshold discussed with reference to the circuit 100 of FIG. 1, are shown in FIG. 2 as a single saturation threshold represented by ghost line 210. That is, in the example shown in FIG. 2, the first saturation threshold, the second saturation threshold, and the third saturation threshold are the same pre-determined voltage level. The integration voltage across the variable capacitance charge storing circuit is initialized to the reset voltage by activation of the reset switch, and begins increasing once the reset switch is deactivated. As discussed above, in various embodiments the clamp switch is activated and deactivated at approximately the same time as the reset switch.

The integration voltage increases until the saturation threshold is met or exceeded a first time (shown as point 204). When the control circuit determines that the saturation threshold has been met or exceeded, the first switch is activated, causing the integration voltage to drop. The integration voltage then begins increasing a second time until the saturation threshold is reached a second time (shown as point 206). When the control circuit determines that the saturation threshold has been met or exceeded for a second time, the second switch is activated, causing the well capacity to increase and the integration voltage to again drop.

As discussed above, in various embodiments the CDS charge storing device may be selectively coupled to the variable capacitance charge storing circuit to further increase the well capacity of the circuit and further integrate the electrical charge accumulated from the photodetector. As FIG. 2 further shows, in various embodiments even after the activation of the second switch and sequential addition of the third charge storing device, the integration voltage may continue increasing. Such may be the case when flux level conditions are high. In such a situation, when the control circuit determines that the saturation threshold has been met or exceeded a third time (shown as point 208), the CDS switch is activated, causing the well capacity to again further increase and the integration voltage to again drop.

Returning to FIG. 1, in various embodiments the circuit 100 includes a sample-hold charge storing device 116 coupled to the first terminal of the CDS charge storing device 114 and the output 152 of the circuit 100. At the end of the integration period, and responsive to activation of the sample-hold switch 132 (e.g., by the control circuit 104), the sample-hold charge storing device 116 is configured to sample and hold the integration voltage of the variable capacitance charge storing circuit 102. The sample-hold charge storing device 116 of various embodiments may be periodically drained to downstream components such as the second and third transistors 140, 142 shown in FIG. 1 to produce an output voltage. For example, the sample-hold charge storing device 116 may provide the held integration voltage as an output voltage. While in one embodiment the voltage at the sample-hold charge storing device 116 may be directly read to generate an image of the viewed scene, in various other embodiments the sample-hold charge storing device 116 may be periodically drained to increment a digital counter and construct a digital image.

While FIG. 1 shows a single unit cell 100 for the sake of explanation, various further embodiments may include an FPA having a plurality unit cell circuits, such as the unit cell circuit 100 discussed with reference to FIG. 1, arranged in rows and columns and coupled to a bus. In such embodiments, the second transistor 140 may include a source follower (e.g., near unity gain voltage buffer) and the third transistor 142 may include a row selection switch. The row selection switch permits the held integration voltage of a single sample-hold charge storing device of a unit cell circuit to be driven to the bus. For example, the bus may include a column wire represented as double arrow 154. The output voltage of the desired unit cell circuit may be selected according to and responsive to receiving a row selection signal "pRowSel."

As FIG. 1 shows, in various embodiments the control circuit 104 may be configured to provide a state signal corresponding to the phase of operation of the circuit 100. For instance, the control circuit 104 may include one or more additional components coupled to the dynamic shift register 136, such as the operator 138. As shown, the operator 138 may also be coupled and configured to provide the state signal to a read-out output node 146. In particular, the state signal may include enable settings of the variable capacitance charge storing circuit 102 (e.g., an enable setting for each switching device of the variable capacitance charge storing circuit 102). That is, the state signal may indicate whether the first switching device 118, second switching device 120, and/or CDS switching device 124 is activated or deactivated. In various embodiments, the state signal from the operator 138 and an output voltage from the unit cell circuit 100, such as the integration voltage from the sample-hold charge storing device 116, permit calculation of the actual charge for a read-out of the unit cell circuit 100. The operator 138 may include a tri-state buffer configured to drive the output of the dynamic shift register 136 onto the read-out output node 146, which may include a digital column bus. In various embodiments, the state signal from the operator 138 is read simultaneously with the output voltage.

As discussed above in more detail, one or more embodiments may include a FPA including a plurality of unit cell circuits, such as the unit cell circuit 100 discussed with reference to FIG. 1. In such embodiments, the operator 138 may select between one or more of the plurality of unit cell circuits, for example, responsive to receiving a row selection signal "pRowSel." In particular instances, the row selection signal may be the same row selection signal as the row selection signal received by the third transistor 142.

The output voltage of the unit cell circuit 100, and the state signal representative of the enable settings of the variable capacitance charge storing circuit 102, may be used to determine of the actual integrated charge of the unit cell circuit 100. That is, the state signal and the output voltage of the unit cell circuit 100 permit the calculation and generation of a signal representative of the optical radiation received. For example, if the first switching device 118, the second switching device 120, and the CDS switching device 124, were not activated during the integration period, the actual integration charge may be determined according to: $[(C_1)*(V_{sig}/q)]$, where "$C_1$" is the value of the first charge storing device 108 and "$V_{sig}$" is the output voltage. Similarly, if the first switching device 118 is activated, the actual integration charge may be determined according to: $[(C_1+C_2)*(V_{sig}/q)]$, where "$C_2$" is the value of the second charge storing device 110. The actual integrated charge for other phases of operation may be determined in a similar manner.

In various embodiments, at the end of the integration period, the control circuit 104 is adapted to activate the reset switch 122 to reset the voltage of the variable capacitance charge storing circuit 102 back to the initial condition (e.g., the reset voltage). In various embodiments, during the activation of the reset switch 122, the dynamic shift register 136 is configured to generate one or more switching signals to deactivate the one or more switching devices of the variable capacitance charge storing circuit 102. Accordingly, during activation of the reset switch 122, the first switch 118, the second switch 120, and in various further embodiments, the CDS switch 124, are deactivated (i.e., opened) such that the variable capacitance charge storing circuit 102 begins the next corresponding integration period with a well capacitance corresponding to the value of the first charge storing device 108. The dynamic shift register 136 may then generate one or more switching signals to reactivate the one or more switching devices as the integration voltage across the variable capacitance charge storing circuit 102 increases.

As described above, during the first phase of operation the one or more switches of the variable capacitance charge storing circuit 102 remain in a deactivated position until the control circuit 104 determines that the integration voltage across the variable capacitance charge storing circuit 102 meets or exceeds a saturation threshold. In such an embodiment, the CDS charge storing device 114 can be configured to store a kTC noise of the first charge storing device 108, and provide noise correction operations.

While not shown in FIG. 1, in various embodiments the control circuit 104 may further include a controller operatively connected to and configured to activate and/or deactivate one or more of the switches of various embodiments, such as the reset switch 122, the sample-hold switch 132, the additional switch 128, and the clamp switch 130. The controller may include a single controller; however, in various other embodiments the controller may consist of a plurality of controllers and/or control subsystems which may include an external device, signal processing circuitry, or other control circuit. In particular, the control circuit 104 may include analog processing circuitry (e.g., a microcontroller) and/or digital signal processing circuitry (e.g., a digital signal processor (DSP)). For instance, the microcontroller of various embodiments may include a processor core, memory, and programmable input/output components. The control circuit 104 may be configured to automatically control various components of the unit cell circuit 104, such as the one or more switching devices.

Figure 3:
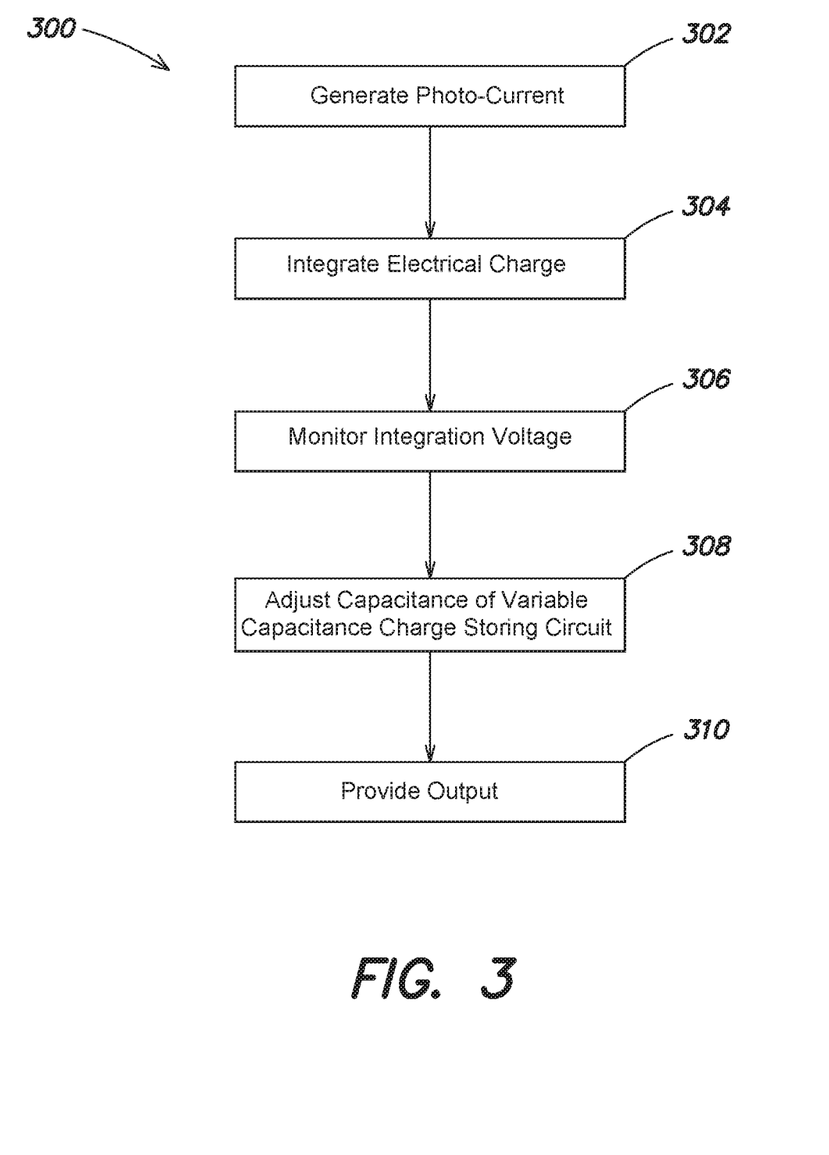
FIG. 3 is an example process flow according to aspects of the invention.

As described above with reference to FIGS. 1-2, several embodiments perform processes for detecting an image. In some embodiments, these processes are executed by an imaging system unit cell, such as the unit cell circuit 100 described above with reference to FIGS. 1-2. One example of such a process is illustrated in FIG. 3. According to this example, the process 300 may include the acts of generating a photo-current, integrating an electrical charge accumulated from the photo-current, monitoring an integration voltage across the variable capacitance charge storing circuit, adjusting a capacitance of the variable capacitance charge storing circuit, and providing an output voltage.

In various embodiments, the process 300 includes generating a photo-current in response to receiving optical radiation at a photodetector (act 302). The circuit accumulates electrical charge at the variable capacitance charge storing circuit corresponding to the flux level of the optical radiation received at the photodetector. As discussed above, optical radiation may include light of any given wavelength, such as light having a wavelength within a range of about 0.3 microns to 2.5 microns. In further embodiments, the process may include generating optical radiation of a particular wavelength and directing the optical radiation at a scene to be imaged within a field of view of a FPA including the unit cell circuit. Accordingly, receiving optical radiation at a photodetector may include receiving optical radiation reflected from the scene to be imaged.

As described above, in various embodiments one or more charge storing devices of the variable capacitance charge storing circuit are configured to receive the photo-current generated by the photodetector, and integrate the accumulated electrical charge. Accordingly, in an embodiment act 304 may include integrating the electrical charge accumulated from the photo-current at the variable capacitance charge storing circuit. In particular, the variable capacitance charge storing circuit may include a first charge storing device, a second charge storing device, and a third charge storing device; however, in other embodiments any number of charge storing devices may be used. As such, in various embodiments integrating the electrical charge accumulated from the photo-current at the variable capacitance charge storing circuit may include integrating the electrical charge accumulated at one, some, or all of the first charge storing device, the second charge storing device, and/or the third charge storing device.

As discussed above, in various embodiments the circuit is configured to dynamically adapt to accommodate low flux levels, high flux levels, and varying flux levels. Accordingly, in various embodiments, act 306 includes monitoring the integration voltage across the variable capacitance charge storing circuit, and act 308 includes adjusting a capacitance of the variable capacitance charge storing circuit based on the integration voltage. In particular, monitoring the integration voltage across the variable capacitance charge storing circuit may include comparing the integration voltage and a saturation threshold, determining whether the integration voltage substantially meets or exceeds the saturation threshold, and responsive to a determination that the integration voltage substantially meets or exceeds the saturation threshold, generating a comparator signal. That is, in various embodiments the process 300 includes determining whether the integration voltage substantially meets or exceeds the saturation threshold, and providing a comparator signal when the integration voltage meets or exceeds that saturation threshold. The saturation threshold of various embodiments may be predetermined, or automatically generated by a control circuit, as discussed above.

In various embodiments, the act of adjusting a capacitance of the variable capacitance charge storing circuit (act 308) includes selectively coupling the one or more charge storing devices of the variable capacitance charge storing circuit in parallel. For instance, this act may include selectively coupling the second charge storing device and the first charge storing device via a first switch, selectively coupling the third charge storing device with the second charge storing device and the first charge storing device via a second switch, and/or selectively coupling the Correlated Double Sampling (CDS) charge storing device with the variable capacitance charge storing circuit via a CDS switch. The selective coupling of each additional charge storing device sequentially increases the well capacity of the variable capacitance charge storing circuit. In particular, this process may include generating one or more switching signals, such as a first switching signal, a second switching signal, and a CDS switching signal, to activate the one or more switches.

The act of generating one or more switching signals may include generating a switching signal to activate the first switch, a switching signal to activate the second switch, or a switching signal to activate the CDS switch, responsive to receiving a comparator signal from the comparator. For example, responsive to receiving a first comparator signal indicating that the integration voltage substantially meets or exceeds a first saturation threshold, the process 300 may include generating the first switching signal to activate the first switch. Similarly, responsive to receiving a second comparator signal indicating that the integration voltage substantially meets or exceeds a second saturation threshold, the process 300 may include generating a second switching signal to activate the second switch. Also, responsive to receiving a third comparator signal indicating that the integration substantially meets or exceeds a third saturation threshold, the process 300 may include generating a CDS switching signal to activate the CDS switch and couple the CDS charge storing device with the variable capacitance charge storing circuit. In particular, activation of each switch increases the well capacity of the circuit.

While described with reference to FIG. 3 as a first, a second, and a third saturation threshold, in various embodiments the first, second, and third, saturation threshold may be the same saturation threshold. That is, the process 300 may include comparing the integration voltage to a single saturation threshold and providing a first comparator signal when the integration voltage meets or exceeds the saturation threshold a first time, providing a second comparator signal when the integration voltage meets or exceeds the saturation threshold a second time, and providing a third comparator signal when the integration voltage meets or exceeds the saturation threshold a third time.

Turning now to act 310, the process 300 may include providing an output voltage based at least in part on the integration voltage. As discussed above, in various embodiments the circuit may include a sample-hold charge storing device coupled to the CDS charge storing device and the output of the circuit. Accordingly, the process 300 may include activating the sample-hold switch and sampling and holding the integration voltage of the variable capacitance charge storing circuit at the sample-hold charge storing device. The sample-hold charge storing device of various embodiments may be periodically drained to downstream components such as the additional transistors shown in FIG. 1 to provide the integration voltage as an output voltage. Further embodiments may include the act of providing a state signal corresponding to the phase of operation of the circuit. In particular, the state signal may include an enable setting of the one or more switching devices of the variable capacitance charge storing circuit. In various embodiments, the state signal from the operator and an output voltage from the circuit permit the calculation of the actual charge for a read-out of the unit cell circuit.

In various embodiments, at the end of the integration period, the process 300 may include one or more acts for restoring the circuit to an initial condition. For instance, the process 300 may include the act of activating the reset switch to reset the voltage of the variable capacitance charge storing circuit back to the reset voltage. In various embodiments, during the activation of the reset switch, the process 300 includes generating one or more switching signals to deactivate the one or more switching devices of the variable capacitance charge storing circuit. Accordingly, during activation of the reset switch, the first switch, the second switch, the third switch, and in various further embodiments the CDS switch are deactivated (i.e., opened) such that the variable capacitance charge storing circuit begins the next phase of operation with a well capacitance corresponding to the value of the first charge storing device.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system unit cell comprising:
    a photodetector configured to generate a photo-current in response to receiving optical radiation;
    a variable capacitance charge storing circuit in electrical communication with the photodetector and configured to integrate an electrical charge accumulated from the photo-current, the variable capacitance charge storing circuit including a first charge storing device, a second charge storing device, and a first switch positioned to selectively couple the second charge storing device and the first charge storing device together in parallel;
    a control circuit configured to monitor an integration voltage across the variable capacitance charge storing circuit and adjust a capacitance of the variable capacitance charge storing circuit based on the integration voltage, the control circuit including:
        a comparator configured to compare the integration voltage and a first saturation threshold and generate a first comparator signal responsive to determining the integration voltage exceeds the first saturation threshold, and
        a dynamic shift register configured to receive the first comparator signal and responsively generate a first switching signal to activate the first switch; and
    an output configured to provide an output voltage based at least in part on the integrated voltage.

2. The imaging system unit cell according to claim 1, wherein the variable capacitance charge storing circuit includes a third charge storing device and a second switch, wherein the control circuit is configured to adjust the capacitance of the variable capacitance charge storing circuit by selectively coupling the third charge storing device together in parallel with the second charge storing device and the first charge storing device via the second switch.

3. The imaging system unit cell according to claim 2, wherein the comparator is configured to compare the integration voltage and a second saturation threshold and generate a second comparator signal responsive to determining the integration voltage exceeds the second saturation threshold, and wherein the dynamic shift register is configured to receive the second comparator signal and generate a second switching signal to activate the second switch.

4. The imaging system unit cell according to claim 3, wherein the first saturation threshold is substantially equal to the second saturation threshold.

5. The imaging system unit cell according to claim 3, wherein the control circuit is configured to provide a state signal including enable settings of the variable capacitance charge storing circuit.

6. The imaging system unit cell according to claim 1, further comprising a Correlated Double Sampling (CDS) charge storing device selectively coupled via a CDS switch with the variable capacitance charge storing circuit.

7. The imaging system unit cell according to claim 6, wherein the CDS charge storing device is configured to integrate the electrical charge accumulated from the photo-current responsive to activation of the CDS switch.

8. An imaging system unit cell comprising:
a photodetector configured to generate a photo-current in response to receiving optical radiation;
a variable capacitance charge storing circuit in electrical communication with the photodetector and configured to integrate an electrical charge accumulated from the photo-current;
a Correlated Double Sampling (CDS) charge storing device selectively coupled via a CDS switch with the variable capacitance charge storing circuit, the CDS charge storing device being configured to integrate the electrical charge accumulated from the photo-current responsive to activation of the CDS switch;
a control circuit configured to monitor an integration voltage across the variable capacitance charge storing circuit and adjust a capacitance of the variable capacitance charge storing circuit based on the integration voltage; and
an output configured to provide an output voltage based at least in part on the integrated voltage.

9. The imaging system unit cell according to claim 8, further comprising a sample-hold charge storing device coupled to the CDS charge storing device via a sample-hold switch, the sample-hold charge storing device configured to sample and hold the integration voltage.

10. The imaging system unit cell according to claim 8, wherein the variable capacitance charge storing circuit includes a first charge storing device and a second charge storing device.

11. The imaging system unit cell according to claim 10, wherein the variable capacitance charge storing circuit includes a first switch positioned to selectively couple the second charge storing device and the first charge storing device together in parallel.

12. A method of detecting an image, the method comprising:
generating a photo-current in response to receiving optical radiation at a photodetector;
integrating an electrical charge accumulated from the photo-current at a variable capacitance charge storing circuit in electrical communication with the photodetector, the variable capacitance charge storing circuit including a first charge storing device, a second charge storing device, and a first switch;
monitoring an integration voltage across the variable capacitance charge storing circuit, including:
comparing the integration voltage and a first saturation threshold,
determining whether the integration voltage exceeds the first saturation threshold, and
responsive to a determination that the integration voltage exceeds the first saturation threshold, generating a first comparator signal;
adjusting a capacitance of the variable capacitance charge storing circuit based on the integration voltage, including generating, with a dynamic shift register, a first switching signal to activate the first switch to couple the second charge storing device and the first charge storing device together in parallel, responsive to receiving the first comparator signal at the dynamic shift register; and
providing an output voltage based at least in part on the integrated voltage.

13. The method according to claim 12, wherein the variable capacitance charge storing circuit includes a third charge storing device and a second switch, and wherein adjusting the capacitance of the variable capacitance charge storing circuit includes selectively coupling the third charge storing device together in parallel with the second charge storing device and the first charge storing device via the second switch.

14. The method according to claim 13, wherein monitoring the integration voltage across the variable capacitance charge storing circuit includes:
comparing the integration voltage and a second saturation threshold;
determining whether the integration voltage exceeds the second saturation threshold; and
responsive to a determination that the integration voltage exceeds the second saturation threshold, generating a second comparator signal.

15. The method according to claim 14, wherein selectively coupling the third charge storing device together in parallel with the second charge storing device and the first charge storing device via the second switch includes generating a second switching signal to activate the second switch responsive to receiving the second comparator signal.

16. The method according to claim 15, wherein the first saturation threshold is substantially equal to the second saturation threshold.

17. The method according to claim 12, further comprising:
selectively coupling a Correlated Double Sampling (CDS) charge storing device with the variable capacitance charge storing circuit; and
integrating the electrical charge accumulated from the photo-current at the CDS charge storing device.

* * * * *